United States Patent Office 2,736,634
Patented Feb. 28, 1956

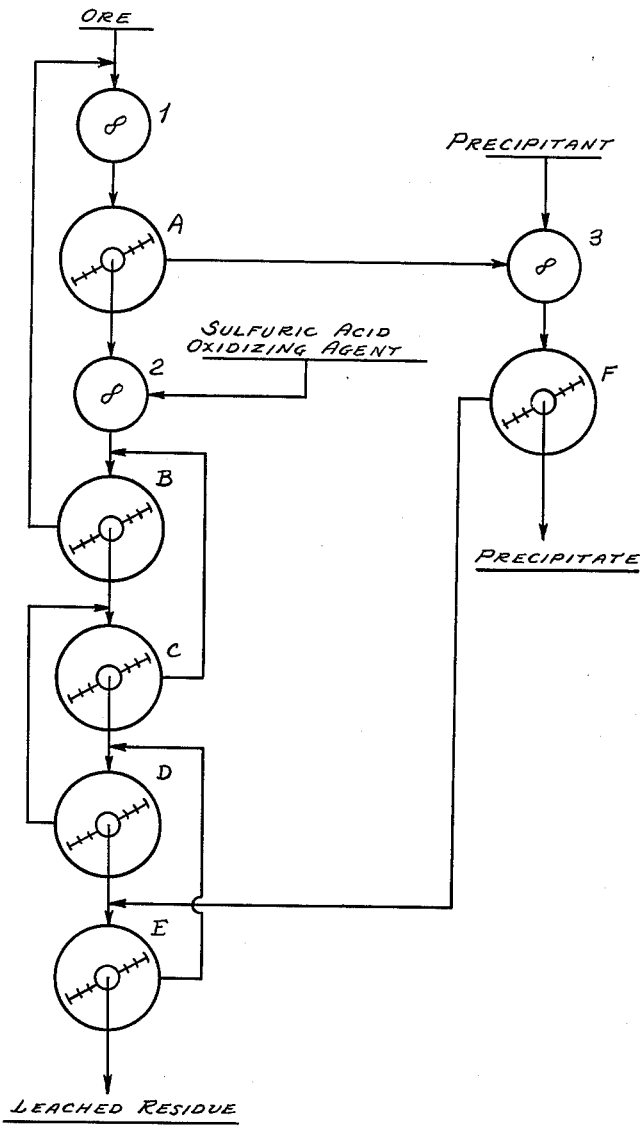
Flowsheet for Continuous, Countercurrent Cyclic Leaching – Example 25

2,736,634

PROCESS FOR EXTRACTING URANIUM FROM ITS ORES

Antoine M. Gaudin, Newtonville, and Reinhardt Schuhmann, Jr., Winchester, Mass., assignors to the United States of America as represented by the United States Atomic Energy Commission Application November 30, 1949, Serial No. 130,218

2 Claims. (Cl. 23—14.5)

This invention relates to a process of extracting uranium from its ores, and more particularly to improved acid leaching processes for separating uranium from its ores and improved precipitation techniques for recovering uranium from the acid leach liquors.

This invention has as an object the provision of an improved acid leaching process for extracting uranium from its ores. A further object of the invention is to provide an acid leaching process which is applicable to many different uranium minerals and uranium bearing ores. A still further object is to provide an improved precipitation process which is useful for recovering uranium from acid leach liquors. Another object is to provide a process for treating ores containing metatorbernite so that the uranium may be more readily recovered therefrom in an acid leaching process. Still another object is to provide a process for working over the leach residues to separate other valuable mineral constituents such as cobalt and radium that may be contained therein.

Another object of the invention is to provide an acid leaching process which can be carried out continuously in contradistinction to the batch leaching processes which have heretofore been employed. Another object of the invention is to provide a leaching process which is carried out with cold dilute acid in contrast to previous leaching processes which have made use of strong acid liquors at elevated temperatures, with obvious attendant difficulties. Another object is to provide a process for leaching uranium from very lean ores which contain only a few thousandths of a percent of uranium. Other objects will appear hereinafter.

These objects are accomplished in accordance with the present invention by leaching uranium minerals and uranium bearing ores with leaching solutions which contain sulfuric acid and ferric iron. The ferric ion may be introduced into the leach liquor by the preliminary and direct addition of ferric sulfate, ferric chloride, or other ferric salt to the sulfuric acid leaching liquor. The ferric ion may also be provided by the action of an added oxidizing agent such as sodium chlorate or manganese dioxide on ferrous ion. The ferrous ion, in turn, may come from the action of sulfuric acid on certain mineral constituents of the ore, or on the metallic iron abraded from machinery during the prior preparation of the ore, or from direct addition to the liquor of a ferrous salt. The uranium is then precipitated from the leach liquors thus obtained by the addition of an alkali, preferably magnesia. The acid leaching and precipitation steps of the present invention may be carried out continuously. The ground ore may be leached continuously in a plurality of leaching agitators, such as Pachuca tanks, which are connected in series. The leach liquor may then be continuously separated from the leach residue by filtration or by countercurrent decantation washing in a series of thickeners. The uranium values may then be continuously precipitated from the pregnant leach liquor by neutralization with an alkali, such as MgO, in a plurality of precipitating agitators connected in series. The precipitate may then be continuously separated from the barren liquor by the use of a precipitate thickener followed by a precipitate filter.

As may be seen from the examples which follow, the leaching processes of the present invention can be used on a wide variety of uranium minerals and uranium bearing ores. Ores containing substantial quantities of metatorbernite are heated to convert the metatorbernite to a lower hydrate which dissolves more readily in the acid leaching solutions. When the gangue of the ore to be leached contains large amounts of magnesite, the magnesite may be separated from the ore by flotation and then converted to magnesia which is used to precipitate the uranium from the acid leach liquors. The leach residues may be further processed, if desired, to recover the valuable mineral constituents contained therein. Radium may be recovered from the leach residue by a hydroseparation step which separates out the radium adsorbed on the surfaces of the fine slime particles. If cobalt is present in the leach residue, it may be extracted therefrom by leaching the residue with sulfurous acid.

The invention is illustrated but not limited by the following examples. In conjunction with Example 25, reference may be had to the flow sheet of the accompanying drawing.

*Example 1*

20 grams of high grade uraninite assaying 80.78% in $U_3O_8$ was pulped with 1,000 grams of water. To this ore pulp there was then added 22.1 grams of $H_2SO_4$ (sp. gr. 1.84) and 15 grams of $Fe_2(SO_4)_3.6H_2O$. This ore pulp with the added reagents was then agitated for 24 hours at a temperature of 20°–22° C. At the end of this time it was found that 99.9% of the uranium values had gone into solution.

When the same test was repeated but the 15 grams of $Fe_2(SO_4)_3.6H_2O$ were omitted, it was found that only 26% of the uranium values went into solution. These experiments showed that ferric sulfate greatly facilitated the dissolution of uraninite in a sulfuric acid solution.

*Example 2*

One gram of metatorbernite which was associated with a little gangue material so that it assayed 47% in $U_3O_8$ as against 59.9% for the theoretical

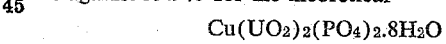

$$Cu(UO_2)_2(PO_4)_2.8H_2O$$

was heated in air for 1 hour at 150° C. This heat treatment apparently converted the copper uranyl phosphate octahydrate to a dihydrate. This heat treated material was then agitated for 1 hour at room temperature (20–22° C.), with 50 ml. of an aqueous solution containing 20 g. of $H_2SO_4$ and 20 g. of $Fe_2(SO_4)_3$ per liter. This resulted in the extraction of 99.6% of the uranium values into the liquid phase.

When the heat treatment was omitted only 28.4% of the uranium values were extracted into the liquid phase even though the mineral was agitated with the leach liquor for 4 hours at room temperature instead of 1 hour. This showed that metatorbernite which has been heat treated and thereby partially dehydrated is more readily dissolved in sulfuric acid solutions than metatorbernite which has not been heat treated.

When the experiment described in the first paragraph of this example was repeated but $Fe_2(SO_4)_3$ was omitted from the leaching solution, only 42.6% of the uranium values were dissolved by the leach liquor. This experiment showed that ferric sulfate materially accelerated the dissolution of metatorbernite in a sulfuric acid solution.

*Example 3*

The uranium bearing ore used in the experiments described in this example assayed 2.54% in $U_3O_8$. Nearly half the uranium in this ore occurred as torbernite and somewhat less than half of it occurred as uranophane. Other uranium bearing minerals present in this ore included uraninite, becquerelite, curite, and kasolite, but these latter minerals only accounted for about 10% of the uranium content of the ore. The ore also contained traces of such iron bearing minerals as magnetite, hematite, goethite, and pyrite, as well as some monazite and garnierite. The gangue which constituted the greater portion of the ore consisted for the most part of quartz, chlorite and chloritic minerals with some traces of magnesite.

The ore described in the preceding paragraph was crushed and pulverized so that only 9.7% of it was coarser than 100 mesh and 66% of it was finer than 200 mesh. This ore was then agitated for 24 hours at room temperature with twice its weight of an aqueous solution containing 100 lbs. of $H_2SO_4$ (sp. gr. 1.84) and 60 lbs. of $Fe_2(SO_4)_3 \cdot 6H_2O$ per ton of ore. After the 24 hour agitation, the ore pulp was filtered. The filter cake was washed twice by repulping it with twice its weight of water followed by filtration. It was found that 97.4% of the uranium values were thus leached from the ore, and only 2.6% of the uranium values were retained in the leach residue. When this experiment was repeated with a leach solution from which the ferric sulfate had been omitted it was found that only 78.8% of the uranium values were extracted from the ore.

*Example 4*

The uranium bearing ore used in the experiments described in this example assayed 1.81% in $U_3O_8$. About half the uranium in this ore occurred as uranophane and about one third of the uranium occurred as uraninite. The remainder of the uranium was present as small portions of curite, sklodowskite, and becquerelite. Other valuable metal bearing minerals such as garnierite, monazite and linnaeite are each present in amounts ranging from 0.25% to 0.75%. Over 93% of this ore is gangue material of which about 59% (based upon the whole ore) is chlorite, about 30% is quartz and about 4% is magnesite, with some traces of iron bearing minerals such as goethite, hematite and magnetite.

The ore described in the preceding paragraph was ground to pass 20 mesh and then agitated for 24 hours at room temperature with twice its weight of an aqueous solution containing 100 lbs. of $H_2SO_4$ (sp. gr. 1.84) and 50 lbs. of $Fe_2(SO_4)_3 \cdot 6H_2O$ per ton of ore. Such a solution actually contained 25 g. of sulfuric acid and 12.5 g. of ferric sulfate per liter. After the 24 hour agitation, the ore pulp was filtered. The filter cake was washed twice by repulping it with about twice its weight of water followed by filtration. It was found that 97.6% of the uranium values were thus leached from the ore, and only 2.4% of the uranium values were retained in the leach residue.

The original leach solution obtained in accordance with the procedure set forth in the preceding paragraph to which no pulp washings had been added was agitated for 30 minutes with 88.1 lbs. of sodium hydroxide per ton of ore leached. The precipitate thus obtained was allowed to settle for 20 hours, and it was then filtered, dried, weighed and assayed. It was found that the dry precipitate assayed 40.52% in $U_3O_8$.

*Example 5*

The uranium bearing ore used in the experiments described in this example assayed 2.09% in $U_3O_8$. About 70% of the uranium in this ore occurred as uranophane. Other uranium minerals found in this ore were uraninite, sklodowskite and torbernite. This ore also contained about 9% of garnierite and less than 1% each of linnaeite and monazite. The bulk of the ore—over 85%—was composed of gangue minerals of which quartz, chlorite and chloritic minerals were the predominant constituents. The gangue also contained minor quantities of magnesite and small amounts of iron bearing minerals such as goethite, hematite and magnetite.

The ore described in the preceding paragraph was ground to pass 20 mesh and then agitated for 24 hours at room temperature with twice its weight of an aqueous solution containing 100 lbs. of $H_2SO_4$ (sp. gr. 1.84) and 50 lbs. of $Fe_2(SO_4)_3 \cdot 6H_2O$ per ton of ore. This solution actually contained 25 g. of sulfuric acid and 12.5 g. of ferric sulfate per liter. After the 24 hour agitation, the ore pulp was filtered. The filter cake was washed twice by repulping it with about twice its weight of water followed by filtration. It was found that 97.4% of the uranium values were thus leached from the ore, and only 2.6% of the uranium values were retained in the leach residue.

The original leach solution obtained in accordance with the procedure set forth in the preceding paragraph to which no pulp washings had been added was agitated for 30 minutes with 92.4 lbs. of sodium hydroxide per ton of ore leached. The precipitate thus obtained was allowed to settle for 20 hours, and it was then filtered, dried, weighed and assayed. It was found that the dry precipitate assayed 35.85% in $U_3O_8$.

*Example 6*

The uranium bearing ore used in the experiments described in this example assayed 3.49% in $U_3O_8$. About half of the uranium in this ore occurred as uranophane. The other leading uranium minerals in this ore were torbernite and sklodowskite. Curite, autunite, uraninite and becquerelite were also present in this ore in significant but small amounts of the order of less than 0.1% by weight. The most important non-uranium mineral found in this ore was garnierite which was present to the extent of about 7% by weight. This ore also contained less than 0.1% each of linnaeite and monazite. The bulk of the ore—over 85%—was composed of gangue minerals of which quartz, chlorite and chloritic minerals were the predominant constituents. The gangue also contained minor quantities of magnesite and small amount of iron bearing minerals such as goethite, hematite and magnetite.

The ore described in the preceding paragraph was ground to pass 10 mesh and then agitated for 24 hours at room temperature with twice its weight of an aqueous solution containing 100 lbs. of $H_2SO_4$ (sp. gr. 1.84) and 50 lbs. of $Fe_2(SO_4)_3 \cdot 6H_2O$ per ton of ore. This solution actually contained 25 g. of sulfuric acid and 12.5 g. of ferric sulfate per liter. After the 24 hour agitation, the ore pulp was filtered. The filter cake was washed twice by repulping it with about twice its weight of water followed by filtration. It was found that 91.4% of the uranium values were thus leached from the ore, and only 8.6% of the uranium values were retained in the leach residue.

The original leach solution obtained in accordance with the procedure set forth in the preceding paragraph to which no pulp washings had been added was agitated for 30 minutes with 82.7 lbs. of sodium hydroxide per ton of ore leached. The precipitate thus obtained was allowed to settle for 20 hours, and it was then filtered, dried, weighed and assayed. It was found that the dried precipitate assayed 39.63% in $U_3O_8$.

*Example 7*

The uranium bearing ore used in the experiments described in this example assayed 1.88% in $U_3O_8$. About half of the uranium in this ore occurred as uranophane and about a third of the uranium was present as uraninite. This ore also contained such uranium minerals as becquerelite, curite, torbernite, soddyite and schoepite, each of which was present in small amounts ranging from 0.01% to 0.2% of the weight of the ore sample. This ore also contained such minerals as monazite, garnierite and linnaeite, each of which was present in amounts ranging from 0.3% to 0.6% of the weight of the ore sample.

The bulk of the ore—over 90%—was composed of gangue minerals of which quartz, chlorite and chloritic minerals were the outstanding constituents. The gangue also contained small quantities of magnesite and small amounts of iron bearing minerals such as goethite, hematite, magnetite and pyrite.

The ore described in the preceding paragraph was ground to pass 20 mesh and then agitated for 24 hours at room temperature with twice its weight of an aqueous solution containing 100 lbs. of $H_2SO_4$ (sp. gr. 1.84) and 50 lbs. of $Fe_2(SO_4)_3 \cdot 6H_2O$ per ton of ore. This solution actually contained 25 g. of sulfuric acid and 12.5 g. of ferric sulfate per liter. After the 24 hour agitation, the ore pulp was filtered. The filter cake was washed twice by repulping it with about twice its weight of water followed by filtration. It was found that 93.5% of the uranium values were thus leached from the ore, and only 6.5% of the uranium values were retained in the leach residue.

The original leach solution obtained in accordance with the procedure set forth in the preceding paragraph to which no pulp washings had been added was agitated for 30 minutes with 97.8 lbs. of sodium hydroxide per ton of ore leached. The precipitate thus obtained was allowed to settle for 20 hours, and it was then filtered, dried, weighed and assayed. It was found that the dried precipitate assayed 33.45% in $U_3O_8$.

*Example 8*

The uranium bearing ore used in the experiments described in this example assayed 4.37% in $U_3O_8$. Somewhat more than half of the uranium in this ore occurred as uranophane, and somewhat more than a third of the uranium was present as uraninite. Other uranium minerals such as sklowdowskite, torbernite and curite were also present in this ore in small amounts, but these three minerals together accounted for less than 10% of the uranium content of this ore. This ore also contained such valuable minerals as monazite, garnierite and linnaeite, each of which was present in amounts ranging from 0.2% to 0.8% of the ore sample. The bulk of the ore—over 90%—was composed of gangue minerals of which quartz, chlorite and chloritic minerals were the leading components. The gangue also contained small quantities of magnesite and small amounts of iron bearing minerals such as goethite, hematite and magnetite.

The ore described in the preceding paragraph was ground to pass 20 mesh and then agitated for 24 hours at room temperature with twice its weight of an aqueous solution containing 100 lbs. of $H_2SO_4$ (sp. gr. 1.84) and 50 lbs. of $Fe_2(SO_4)_3 \cdot 6H_2O$ per ton of ore. This solution actually contained 25 g. of sulfuric acid and 12.5 g. of ferric sulfate per liter. After the 24 hour agitation, the ore pulp was filtered. The filter cake was washed twice by repulping it with about twice its weight of water followed by filtration. It was found that 98.7% of the uranium values were thus leached from the ore, and only 1.3% of the uranium values were retained in the leach residue.

The original leach solution obtained in accordance with the procedure set forth in the preceding paragraph to which no pulp washings had been added was agitated for 30 minutes with 92.5 lbs. of sodium hydroxide per ton of ore leached. The precipitate thus obtained was allowed to settle for 20 hours, and it was then filtered, dried, weighed and assayed. It was found that the dried precipitate assayed 36.3% in $U_3O_8$.

*Example 9*

A portion of the ore described in the first paragraph of Example 4 above was crushed to minus one inch. It was then blunged by agitating it with one-third of its weight of water for one hour and then wet screened on a 20 mesh screen to remove the oversize which constituted 91.1% of the weight of the sample and assayed 1.63% in $U_3O_8$. The screen undersize was then further blunged for 15 minutes and separated in a classifier into sand and slime fractions. The sand fraction constituted 2.8% of the weight of the sample and assayed 3.21% in $U_3O_8$. The oversize from the wet screening was dried and crushed to pass 20 mesh and then mixed with the dried sand fraction from the classifier to give a feed for the leaching tests described in the following paragraph.

The ore feed described in the preceding paragraph was agitated for 24 hours at room temperature with twice its weight of an aqueous solution containing 40 lbs. of $H_2SO_4$ (sp. gr. 1.84) and 40 lbs. of $Fe_2(SO_4)_3 \cdot 6H_2O$ per ton of feed. This solution actually contained 10 g. of sulfuric acid and 10 g. of ferric sulfate per liter. After the 24 hour agitation, the ore pulp was filtered. The filter cake was washed twice by repulping it with about twice its weight of water followed by filtration. It was found that 91.3% of the uranium values were thus leached from the ore feed, and only 8.7% of the uranium values were retained in the leach residue. When ferric sulfate was omitted from the leach liquor described above in this paragraph but other leaching conditions were maintained as in the preceding experiment, it was found that only 72.2% of the uranium values were extracted from the ore feed. Furthermore, when the amounts of $H_2SO_4$ (sp. gr. 1.84) and $Fe_2(SO_4)_3 \cdot 6H_2O$ used in the leaching solution were each raised to 60 lbs. per ton of ore feed, it was found that 98.2% of the uranium values were extracted from the ore feed.

*Example 10*

A portion of the ore described in the first paragraph of Example 5 above was crushed to minus one inch. It was then blunged by agitating it with one-third of its weight of water for one hour and then wet screened on a 20 mesh screen to remove the oversize which constituted 89.8% of the weight of the sample and assayed 1.87% in $U_3O_8$. The screen undersize was then further blunged for 15 minutes and separated in a classifier into sand and slime fractions. The sand fraction constituted 1.6% of the weight of the sample and assayed 2.05% in $U_3O_8$. The oversize from the wet screening was dried and crushed to pass 20 mesh and then mixed with the dried sand fraction from the classifier to give a feed for the leaching tests described in the following paragraph.

The ore feed described in the preceding paragraph was agitated for 24 hours at room temperature with twice its weight of an aqueous solution containing 40 lbs. of $H_2SO_4$ (sp. gr. 1.84) and 40 lbs. of $$Fe_2(SO_4)_3 \cdot 6H_2O$$

per ton of feed. This solution actually contained 10 g. of sulfuric acid and 10 g. of ferric sulfate per liter. After the 24 hours agitation, the ore pulp was filtered. The filter cake was washed twice by repulping it with about twice its weight of water followed by filtration. It was found that 93.8% of the uranium values were thus leached from the ore feed, and only 6.2% of the uranium values were retained in the leach residue. In a comparable experiment in which ferric sulfate was deleted from the leach liquor described above in this paragraph while other leaching conditions were maintained as in the preceding experiment, it was found that only 81.1% of the uranium values were extracted from the ore feed. In another comparable experiment wherein the amounts of $H_2SO_4$ and $Fe_2(SO_4)_3 \cdot 6H_2O$ used in the leaching solution were each raised to 60 lbs. per ton of ore feed while other leaching conditions were maintained as in the first experiment mentioned in this paragraph, it was found that 96.6% of the uranium values were extracted from the ore feed.

*Example 11*

A portion of the ore described in the first paragraph of Example 7 above was crushed to minus one inch. It was then blunged by agitating it with one-third of its weight of water for one hour and then wet screened on a 20 mesh screen to remove the oversize which constituted 92.7% of the weight of the sample and assayed 1.21% in $U_3O_8$. The screen undersize was then further blunged for 15 minutes and separated in a classifier into sand and slime fractions. The sand fraction constituted 1.7% of the weight of the sample and assayed 1.73% in $U_3O_8$. The oversize from the wet screening was dried and crushed to pass 20 mesh and then mixed with the dried sand fraction from the classifier to give a feed for the leaching tests described in the next paragraph.

The ore feed described in the preceding paragraph was agitated for 24 hours at room temperature with twice its weight of an aqueous solution containing 40 lbs. of $H_2SO_4$ (sp. gr. 1.84) and 40 lbs. of $Fe_2(SO_4)_3 \cdot 6H_2O$ per ton of feed. This solution actually contained 10 g. of sulfuric acid and 10 g. of ferric sulfate per liter. After the 24 hour agitation, the ore pulp was filtered. The filter cake was washed twice by repulping it with about twice its weight of water followed by filtration. It was found that 86.7% of the uranium values were thus leached from the ore feed. In a comparable experiment in which ferric sulfate was deleted from the leach liquor described above in this paragraph while other leaching conditions were maintained as in the preceding experiment, it was found that only 78.3% of the uranium values were extracted from the ore feed. In another comparable experiment wherein the amounts of $H_2SO_4$ and $$Fe_2(SO_4)_3 \cdot 6H_2O$$

used in the leaching solution were each raised to 60 lbs. per ton of ore feed while other leaching conditions were maintained as in the first experiment mentioned in this paragraph, it was found that 96.4% of the uranium values were extracted from the ore feed.

*Example 12*

A portion of the ore described in the first paragraph of Example 8 above was crushed to minus one inch. It was then blunged by agitating it with one-third of its weight of water for one hour and then wet screened on a 20 mesh screen to remove the oversize which constituted 88.5% of the weight of the sample and assayed 1.58% in $U_3O_8$. The screen undersize was then further blunged for 15 minutes and separated in a classifier into sand and slime fractions. The sand fraction constituted 2.2% of the weight of the sample and assayed 5.13% in $U_3O_8$. The oversize from the wet screening was dried and crushed to pass 20 mesh and then mixed with the dried sand fraction from the classifier to give a feed for the leaching tests described in the next paragraph.

The ore feed described in the preceding paragraph was agitated for 24 hours at room temperature with 1.71 times its weight of an aqueous solution containing 34.3 lbs. of $H_2SO_4$ (sp. gr. 1.84) and 34.3 lbs. of $$Fe_2(SO_4)_3 \cdot 6H_2O$$

per ton of feed. This solution actually contained 10 g. of sulfuric acid and 10 g. of ferric sulfate per liter. After the 24 hour agitation, the ore pulp was filtered. The filter cake was washed twice by repulping it with about twice its weight of water followed by filtration. It was found that 96.1% of the uranium values were thus leached from the ore feed, and only 3.9% of the uranium values were retained in the leach residue. In a comparable experiment in which ferric sulfate was deleted from the leach liquor described above in this paragraph while other leaching conditions were maintained as in the preceding experiment, it was found that only 58.9% of the uranium values were extracted from the ore feed while 41.1% of the uranium values were retained in the leach residue.

*Example 13*

The ore described in the first paragraph of Example 4 was crushed to pass a 20 mesh screen. The crushed ore was then split into a number of samples which were agitated at room temperature for different lengths of time with equal weights of aqueous solutions which contained different quantities of sulfuric acid and ferric sulfate per ton of ore. The sulfuric acid used in these solutions was a chemically pure reagent sulfuric acid having a specific gravity of 1.84. The ferric sulfate used in making up these solutions was a commercial anhydrous ferric sulfate that analyzed 96.6% in $Fe_2(SO_4)_3$. The quantities of $H_2SO_4$ used in these solutions varied from 20 lbs. to 80 lbs. per ton of ore, which meant that the sulfuric acid concentration in these solutions varied from 10 g. to 40 g. per liter. The quantities of ferric sulfate used in these solutions varied from 10 lbs. to 80 lbs. per ton of ore, which meant that the ferric sulfate concentration in these solutions varied from 5 g. to 40 g. per liter.

The ore samples were agitated with equal weights of these various leaching solutions for periods of 1 hour, 4 hours, and 24 hours. At the end of the desired leaching period the ore pulp was filtered, and the filter cake was washed three times by repulping it with about 1.7 times its weight of water followed by filtration. It was found that leaching for one hour resulted in recoveries of from 75% to 87% of the uranium values from the ore. It was found that much better extractions were obtained when the leaching period was extended to 4 hours, but that optimum recoveries of the uranium values were obtained when the leaching period was prolonged to 24 hours. When the leach liquor contained less than 40 lbs. of sulfuric acid and 20 lbs. of ferric sulfate per ton of ore, it was found that the recovery of uranium fell below 95% in the 24 hour leaches. An optimum recovery of 97.5% of the uranium values in a 24 hour leach period which left a leach residue assaying only 0.05% in $U_3O_8$ was obtained by leaching this ore with an equal weight of a leach solution which contained 80 lbs. of sulfuric acid and 20 lbs. of ferric sulfate per ton of ore. Increasing the amounts of sulfuric acid and/or ferric sulfate used in the leach liquors above this concentration resulted in only slightly increased uranium recoveries.

*Example 14*

The ore described in the first paragraph of Example 5 was crushed to pass a 20 mesh screen. The crushed ore was then split into a number of samples which were agitated at room temperature for different lengths of time with equal weights of aqueous solutions which contained different quantities of sulfuric acid and ferric sulfate per ton of ore. The sulfuric acid used in these solutions was a chemically pure reagent sulfuric acid having a specific gravity of 1.84. The ferric sulfate used in making up these solutions was a commercial anhydrous ferric sulfate that analyzed 96.6% in $Fe_2(SO_4)_3$. The quantities of $H_2SO_4$ used in these solutions varied from 20 lbs. to 160 lbs. per ton of ore, which meant that the sulfuric acid concentration in these solutions varied from 10 g. to 80 g. per liter. The quantities of ferric sulfate used in these solutions varied from 10 lbs. to 80 lbs. per ton of ore, which meant that the ferric sulfate concentration in these solutions varied from 5 g. to 40 g. per liter.

The ore samples were agitated with equal weights of these various leaching solutions for periods of 1 hour, 4 hours, and 24 hours. At the end of the desired leaching period the ore pulp was filtered and the filter cake was washed three times by repulping it with about 1.7 times it weight of water followed by filtration. It was found that leaching for one hour resulted in recoveries of from 79% to 94% of the uranium values from the ore, while the amount of uranium extracted during the four hour leaching was nearly as great as that extracted in the 24 hour leaching. Optimum recoveries of the uranium values were obtained when the leaching period was prolonged to 24 hours. When the leach liquor contained less than 40 lbs. of sulfuric acid and 10 lbs. of ferric sulfate per ton of ore, it was found that the recovery of uranium fell below 93% in the 24 hour leaching, so that the use of smaller quantities of these two reagents in the leaching of this ore was not considered advisable. An optimum recovery of 97.5% of the uranium values in a 24 hour leach period which left a leach residue assaying only 0.05% in $U_3O_8$ was obtained by leaching this ore with an equal weight of a leach solution which contained 80 lbs. of sulfuric acid and 10 lbs. of ferric sulfate per ton of ore. Increasing the amounts of sulfuric acid and/or ferric sulfate used in the leach liquors above this concentration resulted in only slightly increased uranium recoveries.

*Example 15*

The ore described in the first paragraph of Example 8 was crushed to pass a 20 mesh screen. The crushed ore was then split into a number of samples which were agitated at room temperature for different lengths of time with equal weights of aqueous solutions which contained different quantities of sulfuric acid and ferric sulfate per ton of ore. The sulfuric acid used in these solutions was a chemically pure reagent sulfuric acid having a specific gravity of 1.84. The ferric sulfate used in making up these solutions was a commercial anhydrous ferric sulfate that analyzed 96.6% in $Fe_2(SO_4)_3$. The quantities of sulfuric acid used in these solutions varied from 20 lbs. to 80 lbs. per ton of ore, which meant that the sulfuric acid concentration in these solutions varied from 10 g. to 40 g. per liter. The quantities of ferric sulfate used in these solutions varied from 10 lbs. to 80 lbs. per ton of ore, which meant that the ferric sulfate concentration in these solutions varied from 5 g. to 40 g. per liter.

The ore samples were agitated with equal weights of these various leaching solutions for periods of 1 hour, 4 hours, and 24 hours. At the end of the desired leaching period the ore pulp was filtered and the filter cake was washed three times by repulping it with about 1.7 times its weight of water followed by filtration. It was found that leaches of one hour duration resulted in recoveries of only 51% to 83% of the uranium values from the ore. The amount of uranium extracted during the four hour leaches varied from 61% to 88% except when 80 lbs. of ferric sulfate per ton of ore was employed in the leach solution, in which latter case the uranium recoveries rose above 90%. Optimum recoveries of the uranium values were obtained when the leaching period was prolonged to 24 hours. When the leach liquor contained less than 40 lbs. of sulfuric acid and 40 lbs. of ferric sulfate per ton of ore, it was found that the recovery of uranium fell below 90% in the 24 hour leaches, so that the use of smaller quantities of these two reagents in the leaching of this ore was not considered advisable. An optimum recovery of 97.9% of the uranium values in a 24 hour leach period which left a leach residue assaying only 0.07% in $U_3O_8$ was obtained by leaching this ore with an equal weight of a leach solution which contained 80 lbs. of sulfuric acid and 40 lbs. of ferric sulfate per ton of ore. When leaching was carried out under identical conditions with a leach solution which contained 80 lbs. of sulfuric acid per ton of ore and no ferric sulfate, the recovery of uranium fell to 63%. Increasing the amounts of sulfuric acid and/or ferric sulfate used in the leach liquors above 80 lbs. and 40 lbs. respectively per ton of ore resulted in only slightly increased uranium recoveries.

*Example 16*

The ore described in the first paragraph of Example 6 was crushed to pass a 20 mesh screen. Portions of this crushed ore were then heat treated for 30 minutes at 200° C. The purpose of the heat treatment was to convert the metatorbernite contained in this ore to a partially dehydrated form which is more readily dissolved in sulfuric acid solutions. See Example 2 above. This heat treatment might also be carried out at lower temperatures, such as 110° C., if the period of heating is made longer or at higher temperatures such as 300° C.

The crushed ore was then split into a number of samples which were agitated at room temperature for different lengths of time with aqueous solutions which contained different quantities of sulfuric acid and ferric sulfate per ton of ore. The sulfuric acid used in these solutions was a chemically pure reagent sulfuric acid having a specific gravity of 1.84. The ferric sulfate used in making up these solutions was a commercial anhydrous ferric sulfate that analyzed 96.6% in $Fe_2(SO_4)_3$. The quantities of sulfuric acid used in these solutions varied from 20 lbs. to 160 lbs. per ton of ore, which meant that the sulfuric acid concentration in the leach solutions varied from 10 g. to 80 g. per liter when the ore was treated with an equal weight of leaching solution. The quantities of ferric sulfate used in these solutions varied from 20 lbs. to 160 lbs. per ton of ore, which meant that the ferric sulfate concentration in these solutions varied from 10 g. to 80 g. per liter when the ore was treated with an equal weight of leaching solution.

The ore samples were agitated with equal or double their weight of these various leaching solutions for periods of 1 hour, 4 hours, and 24 hours. At the end of the desired leaching period the ore pulp was filtered and the filter cake was washed three times by repulping it with about 1.7 times its weight of water followed by filtration. It was found that the leaches of one hour duration did not give satisfactory recoveries of the uranium values. The amount of uranium extracted during the four hour leaches compared quite favorably with the amount of uranium extracted in the 24 hour leaches, but it was considered that optimum recoveries of the uranium values were obtained when the leaching period was prolonged to 24 hours. When the leach liquor contained less than 80 lbs. of sulfuric acid and 20 lbs. of ferric sulfate per ton of ore, it was found that the recovery of uranium generally fell below 90%, so that the use of smaller quantities of these two reagents in the leaching of this ore was not considered advisable. An optimum recovery of 97.6% of the uranium values in a 24 hour leach period which left a leach residue assaying only 0.08% in $U_3O_8$ was obtained by leaching this heat treated ore with an equal weight of a leach solution which contained 120 lbs. of sulfuric acid and 40 lbs. of ferric sulfate per ton of ore. Increasing the amounts of sulfuric acid and/or ferric sulfate used in the leaching solutions above this concentration resulted in only slightly increased uranium recoveries.

*Example 17*

25 parts by weight of the ore which was described in the first paragraph of Example 4 was ground to pass a 20-mesh screen and pulped up in a Pachuca tank with 19 parts by weight of water. To this ore pulp there was then added 80 lbs. per ton of $H_2SO_4$ (sp. gr. 1.84) and 40 lbs. per ton of a commercial grade of anhydrous ferric sulfate. This mixture was agitated continuously in the Pachuca tank for 24 hours at ambient temperature. Then the pulp was diluted with water to a pulp dilution of about 2 parts of liquid to 1 part of ore by weight, thoroughly mixed, and allowed to settle. After settling overnight, the clear supernatant leach liquor was siphoned off and further clarified by filtration. The leach liquor thus obtained analyzed 8.84 grams per liter in $U_3O_8$. To this leach liquor there was then slowly added over a 30 minute period a 15.4% aqueous slurry of finely ground caustic calcined magnesia in an amount equivalent to approximately 35 lbs. of MgO per ton of original ore. The leach liquor was agitated for about 60 minutes after the addition of the magnesia slurry had been completed. At the end of this time the pH of the liquor was about 7. The precipitate thus obtained was filtered and dried at 80°–90° C. for 24 hours. This dried precipitate was analyzed and found to assay 31% in $U_3O_8$, 12.4% in $Fe_2O_3$, 1.4% in CuO, 3.6% in NiO, 6.5% in CoO, 2.6% in CaO, 5.2% in MgO, 8.9% in $Al_2O_3$, and 4.6% in $SiO_2$, with the balance chiefly made up of water that could be driven off by ignition of the precipitate. Only 0.04% of the uranium values that were present in the original leach liquor were not removed therefrom by this precipitation.

When this same ore was leached in a similar manner using 60 lbs. of $H_2SO_4$ and 30 lbs. of $Fe_2(SO_4)_3$ per ton of ore, a leach liquor was obtained that analyzed 7.39 grams per liter in $U_3O_8$. This leach liquor was precipitated using 25.6 lbs. per ton of caustic calcined magnesia. The precipitate thus obtained after drying was found to assay 39.3% in $U_3O_8$, while only 0.45% of the uranium originally present in the leach liquor was not precipitated. Compared with results given in the preceding paragraph it was seen that changes in the amount of leaching reagents employed affected the amount of magnesia required to effect precipitation and also the $U_3O_8$ assay of the precipitate.

*Example 18*

25 parts by weight of the ore which was described in the first paragraph of Example 5 was ground to pass a 20-mesh screen and pulped up in a Pachuca tank with 19 parts by weight of water. To this ore pulp there was then added 80 lbs. per ton of $H_2SO_4$ (sp. gr. 1.84) and 40 lbs. per ton of a commercial grade of anhydrous ferric sulfate. This mixture was agitated continuously in the Pachuca tank for 24 hours at ambient temperature. Then the pulp was diluted with water to a pulp dilution of about 2 parts of liquid to 1 part of ore by weight, thoroughly mixed, and allowed to settle. After settling overnight, the clear supernatant leach liquor was siphoned off and further clarified by filtration. The leach liquor thus obtained analyzed 9.51 grams per liter in $U_3O_8$. To this leach liquor there was then slowly added over a 30 minute period a 15.4% aqueous slurry of finely ground caustic calcined magnesia in an amount equivalent to approximately 34.5 lbs. of MgO per ton of original ore. The leach liquor was agitated for about 30 minutes after the addition of the magnesia slurry had been completed. At the end of this time the pH of the liquor was about 7. The precipitate thus obtained was filtered and dried at 80°–90° C. for 24 hours. This dried precipitate was analyzed and found to assay 34% in $U_3O_8$. Only 0.06% of the uranium values that were present in the original leach liquor remained therein after this precipitation.

When this same ore was leached in a similar manner using 60 lbs. of $H_2SO_4$ and 30 lbs. of $Fe_2(SO_4)_3$ per ton of ore, a leach liquor was obtained that analyzed 9.46 grams per liter in $U_3O_8$. This leach liquor was precipitated using 24.6 lbs. per ton of finely ground caustic calcined magnesia added as an aqueous slurry. The precipitate thus obtained after drying was found to assay 42.6% in $U_3O_8$, 9.2% in $Fe_2O_3$, 2.6% in CuO, 2.4% in NiO, 3.4% in CoO, 5.2% in MgO, 2.5% in $Al_2O_3$, and 6.8% in $SiO_2$, with the balance chiefly made up of water that could be driven off by ignition of the precipitate. Only 0.5% of the uranium values that were present in the original leach liquor were not removed therefrom by this precipitation.

*Example 19*

25 parts by weight of the ore which was described in the first paragraph of Example 6 was ground to pass a 20-mesh screen and pulped up in a Pachuca tank with 19 parts by weight of water. To this ore pulp there was then added 80 lbs. per ton of $H_2SO_4$ (sp. gr. 1.84) and 40 lbs. per ton of a commercial grade of anhydrous ferric sulfate. This mixture was agitated continuously in the Pachuca tank for 24 hours at ambient temperature. Then the pulp was diluted with water to a pulp dilution of about 2 parts of liquid to 1 part of ore by weight, thoroughly mixed, and allowed to settle. After settling overnight, the clear supernatant leach liquor was siphoned off and further clarified by filtration. The leach liquor thus obtained analyzed 15.84 grams per liter in $U_3O_8$. To this leach liquor there was then added a 15.4% aqueous slurry of finely ground caustic calcined magnesia in an amount equivalent to approximately 35.4 lbs. of MgO per ton of original ore. The leach liquor was agitated for an hour after the addition of the magnesia slurry had been completed. At the end of this time the pH of the liquor was about 7. The precipitate thus obtained was filtered and dried at 80°–90° C. for 24 hours. This dried precipitate was analyzed and found to assay 40.1% in $U_3O_8$, 8.6% in $Fe_2O_3$, 2.8% in CuO, 3.2% in NiO, 6.4% in CoO, 2.7% in CaO, 4% in MgO, 5% in $Al_2O_3$, and 4.8% in $SiO_2$, with the balance chiefly made up of water that could be driven off by ignition of the precipitate. Only 0.05% of the uranium values that were present in the original leach liquor remained therein after this precipitation.

*Example 20*

25 parts by weight of the ore which was described in the first paragraph of Example 7 was ground to pass a 20-mesh screen and pulped up in a Pachuca tank with 19 parts by weight of water. To this ore pulp there was then added 60 lbs. per ton of $H_2SO_4$ (sp. gr. 1.84) and 30 lbs. per ton of a commercial grade of anhydrous ferric sulfate. This mixture was agitated continuously in the Pachuca tank for 24 hours at ambient temperature. Then the pulp was diluted with water to a pulp dilution of about 2 parts of liquid to 1 part of ore by weight, thoroughly mixed, and allowed to settle. After settling overnight, the clear supernatant leach liquor was siphoned off and further clarified by filtration. The leach liquor thus obtained analyzed 6.58 grams per liter in $U_3O_8$. To this leach liquor there was then added a 15.4% aqueous slurry of finely ground caustic calcined magnesia in an amount equivalent to approximately 23 lbs. of MgO per ton of original ore. The leach liquor was agitated for 75 minutes after the addition of the magnesia slurry had been completed. At the end of this time the pH of the liquor was about 7. The precipitate thus obtained was filtered and dried at 80°–90° C. for 24 hours. This dried precipitate was analyzed and found to assay 36.7% in $U_3O_8$, 14% in $Fe_2O_3$, 1.1% in CuO, 2.6% in NiO, 5.9% in CoO, 3.1% in CaO, 3.5% in MgO, 5.4 in $Al_2O_3$, and 5.7% in $SiO_2$ with the balance chiefly made up of water that could be driven off by ignition of the precipitate. Only 0.09% of the uranium values that were present in the original leach liquor remained therein after this precipitation.

*Example 21*

25 parts by weight of the ore which was described in the first paragraph of Example 8 was ground to pass a 20-mesh screen and pulped up in a Pachuca tank with 19 parts by weight of water. To this ore pulp there was then added 80 lbs. per ton of $H_2SO_4$ (sp. gr. 1.84) and 40 lbs. per ton of a commercial grade of anhydrous ferric sulfate. This mixture was agitated continuously in the Pachuca tank for 24 hours at ambient temperature. Then the pulp was diluted with water to a pulp dilution of about 2 parts of liquid to 1 part of ore by weight, thoroughly mixed, and allowed to settle. After settling overnight, the clear supernatant leach liquor was siphoned off and further clarified by filtration. The leach liquor thus obtained analyzed 14.27 grams per liter in $U_3O_8$. To this leach liquor there was then added a 15.4% aqueous slurry of finely ground caustic calcined magnesia in an amount equivalent to approximately 35 lbs. of MgO per ton of original ore. The leach liquor was agitated for about an hour after the addition of the magnesia slurry had been completed. At the end of this time the pH of the liquor was about 7. The precipitate thus obtained was filtered and dried at 80°–90° C. for 24 hours. This dried precipitate was analyzed and found to assay 44.3% in $U_3O_8$, 8.9% in $Fe_2O_3$, 0.2% in CuO, 1.8% in NiO, 1.8% in CoO, 6.1% in MgO, 4.2% in $Al_2O_3$, and 5.4% in $SiO_2$ with the balance chiefly made up of water that could be driven off by ignition of the precipitate.

*Example 22*

Several leach residues obtained by heat treating and leaching the ore described in the first paragraph of Example 6 in accordance with the technique described in Example 16 were combined and well mixed. This composite leach residue was analyzed and found to assay 1.93% in CoO. The ore before leaching contained about 2.6% of CoO. The following paragraphs of this example show how this composite leach residue has been processed to extract the cobalt therefrom.

A charge of this composite leach residue was pulped with about an equal weight of water. Sulphur dioxide was then bubbled through the ore pulp for about an hour at room temperature while the pulp was being stirred. Agitation of the pulp was continued for 24 hours after the introduction of $SO_2$ had been completed. After the agitation was completed, the leach liquor was filtered off. This leach residue was washed three times by repulping it with about twice its weight of water followed by filtration. It was found that 78.1% of the cobalt values were extracted from the composite leach residue from which the uranium had already been extracted.

When the composite leach residue was pulped with about an equal weight of water which contained 100 lbs. of $H_2SO_4$ per ton of residue to be treated, and the $SO_2$ treatment and extraction were carried out as set forth in the preceding paragraph, it was found that 79.6% of the cobalt was extracted from the composite leach residue.

*Example 23*

25 parts by weight of the ore described in the first paragraph of Example 5 were ground to pass a 20-mesh screen and pulped up in a Pachuca tank with 19 parts by weight of water. To this ore pulp there was then added 80 lbs. per ton of $H_2SO_4$ (sp. gr. 1.84) and 10 lbs. per ton of a commercial grade of anhydrous ferric sulfate. This mixture was agitated continuously in the Pachuca tank for 24 hours at ambient temperature. At the expiration of the 24 hour leaching period, the pulp was diluted with water to about 3.5 times its volume and then allowed to settle. After decanting the supernatant liquor, the pulp was mixed with fresh water and allowed to settle again. This mixing and settling operation was carried out five times. After the final washing the residue cake was dried. It was found that this dried residue cake assayed 0.98% in CoO. The ore being treated assayed 1.24% in CoO. This showed that approximately 21% of the cobalt was extracted along with the uranium and that the leach residue cake contained 79% of the cobalt values originally present in the ore.

A portion of the leach residue cake described in the preceding paragraph was pulped with twice its weight of water. The pulp was agitated while $SO_2$ was slowly bubbled through it for a period of 1 hour at room temperature. After the introduction of $SO_2$ was terminated, the plup was agitated for an additional 23 hours. At the end of this time the pulp was filtered. The filter cake was washed three times by repulping it with twice its weight of water followed by filtration. It was found that 65% of the cobalt values contained in the leach residue cake were thus extracted.

The $SO_2$ gas which was bubbled into the ore pulp dissolved, in part, to form sulfurous acid, some of which, in turn, was oxidized to sulfuric acid. Thus the lixiviant was a combination of sulfurous and sulfuric acids. It was found that, if the water in which the leach residue cake was pulped and treated with $SO_2$ had added thereto 100 lbs. of $H_2SO_4$ for each ton of residue to be treated, the amount of cobalt extracted was somewhat increased over the amount obtained when $SO_2$ was used in the absence of initially added $H_2SO_4$.

In order to recover cobalt from the leach liquor in which it had been extracted, said leach liquor was treated in the following manner. It was boiled to remove excess $SO_2$. This boiling resulted in the formation of a copper precipitate which carried down a negligible amount of cobalt with it. This precipitate was removed, and air was bubbled through the cobalt leach liquor for 1 hour. Then an aqueous solution of sodium hydroxide was added with continuous agitation until the pH rose to 6.0. This resulted in the formation of a precipitate containing iron which was removed by filtration. Then NaOCl in the form of a 12% solution was added to the filtrate. This caused the pH of the filtrate to drop rapidly at first. Enough NaOCl was added to the filtrate to bring its pH up to 6.0 once again. This addition of NaOCl caused about 95% of the cobalt in said filtrate to precipitate as cobaltic oxide, $Co_2O_3$.

*Example 24*

This example describes the application of the present invention to the extraction of uranium from lean uranium bearing ore. This ore analyzed 0.17% in $U_3O_8$ and contained some gold. This gold and uranium was mostly in a quartzitic matrix which surrounded quartz pebbles. This ore also contained about 10% of a foliated silicate mineral, such as sericite or pyrophyllite and also contained some pyrite and carbonaceous material. The carbonaceous material carried both gold and uranium. The ore also contained very small quantities of heavy minerals such as ilmenite, rutile, chromite, magnetite, zircon and tourmaline. The uranium in the ore was practically all in the form of uraninite.

This ore was crushed dry through 20-mesh, and an equal weight of water was added thereto to form a pulp containing about 50% of solids. To this pulp there was added 20 lbs. of $H_2SO_4$ (sp. gr. 1.84) and 20 lbs. of a commercial grade of anhydrous ferric sulfate per ton of solid in said pulp. The leach liquor was allowed to act on the ore for 24 hours, after which the ore pulp was filtered and washed three times by repulping the residue with twice its weight of water followed by filtration. An 81% extraction of the uranium in said ore was thereby obtained. Somewhat better extraction of uranium was obtained by grinding the ore more finely, by using greater quantities of reagents, and by extending the period in which the ore is allowed to be in contact with the leach liquor. No close control of the temperature of the uranium leach liquors is necessary to the success of applicants' process. It is only necessary to keep the temperature of the leach liquor above its freezing point, and hence the leaching process can ordinarily be carried out at the temperature which is prevailing in the vicinity of the leaching equipment. The uranium in the pregnant leach liquors may be precipitated therefrom by the addition of caustic calcined magnesia or calcined dolomite thereto.

The process as described in this example may be used to extract uranium from a similar type of ore which analyzes as low as 0.005% in $U_3O_8$. Even when the uranium content is this low, the recovery of the uranium from the ore is comparable to that obtained on the ore described in the first paragraph of this example.

Flotation concentrates from low grade uranium ores which have had their uranium content increased by flotation may also be satisfactorily leached in accordance with the general procedure described in this example.

*Example 25*

This example demonstrates the use of a solution of cold, dilute sulfuric acid containing a small concentration of ferric iron to leach uranium from a low-grade ore in a continuous, countercurrent, cyclic operation. The ore had the same mineralogy as that described in Example 24 and came from the same mine; however, the uranium content was only 0.021 percent $U_3O_8$.

This ore had already undergone treatment for the removal of gold and was already ground so that 75 percent would pass through a 200-mesh screen. The leaching plant in which this work was done was operated continuously for 51 days with some modifications of flowsheet; however, for the purposes of this example the operation of this continuous leaching plant is described as it was operated from the 30th through to the 36th day. During this period, this plant was operated substantially according to the attached flowsheet. In the flowsheet agitators have been given numbers and thickeners have been designated by letters.

Ore was fed into agitator 1 at a rate of 17 pounds per hour and pulped with overflow liquor from thickener B to 25 percent solids. This overflow liquor was at a pH approximating 2. The pH of the slurry in agitator 1 was approximately 3.5 so that any ferric iron in the liquor feeding this agitator was precipitated. Therefore, the overflow liquor from thickener B was partially neutralized by the ore which contained some soluble acid-consuming constituents. The retention time in agitator 1 was 11.5 hours. From agitator 1 the slurry was fed to thickener A. The overflow from this thickener was the final pregnant solution and was sent to precipitation at 3. The uranium in this pregnant solution was precipitated with MgO at a pH of approximately 6.5. The precipitate was dewatered by a thickener F and the barren solution was returned to the leaching system for wash on the residue.

The underflow from thickener A was the partially leached ore containing precipitated ferric iron. This underflow at about 50 percent solids was sent to agitator 2 to which was added sulfuric acid and additional oxidizing agent. In this instance the oxidizing agent added was $MnO_2$ which oxidized ferrous iron dissolved from the ore to ferric iron. The pH in agitator 2 was approximately 2 and the retention time averaged 28.6 hours.

Slurry from agitator 2 was sent to thickener B. Overflow from thickener B was the liquor returned to agitator 1. Underflow from thickener B was the barren residue which was sent through a 3-stage countercurrent decantation system (thickeners C, D and E) for washing. The average washed residue during this 6-day period of operation contained 0.0041 percent $U_3O_8$, that is only 19.5 percent of the uranium originally contained in the ore; 80.5 percent of the uranium in the original ore was extracted in the leach liquor and sent to precipitation.

In this example manganese dioxide has been used as a source of oxidizing power. Its purpose, as stated above, is to convert dissolved ferrous salts to ferric salts. The dissolved ferrous salts, in turn, are provided by some acid-soluble silicate minerals in the ore, metallic iron formed by the abrasion of machinery, and the cycled barren leach liquor. Obviously, in this cyclic system the iron added to the liquor by action of the acid on metallic iron and silicate minerals equals the iron removed from the liquor in the uranium precipitate and the last wash going out of the system with the spent residue. The iron content of the leach liquor overflowing B and going to agitator 1 was approximately 1.3 grams Fe per liter, an amount equivalent, in a batch system, using addition of commercial ferric sulfate, to the iron in 27 pounds Ferrisul per ton of feed. The sulfuric acid consumed was 38.7 pounds per ton of ore and the $MnO_2$ consumed was 4.65 pounds per ton of ore. The manganese dioxide was added in such a way as to maintain a ferric iron concentration of 0.3 gram ferric iron per liter in the overflow from thickener B. This amount of manganese dioxide is equivalent in oxidizing power to approximately 22 pounds of Ferrisul per ton of feed.

In the example given above, thickeners have been used for dewatering. At other times the same flowsheet has been used with filters in place of thickeners. One filter is required to replace thickener A and another filter to replace thickeners B, C, D and E. Washing is done by displacement on the filters. When filters are used the pulp in agitators 1 and 2 is at 60 percent solids instead of 25 percent and 50 percent respectively.

By means of this two-stage, countercurrent, cyclic process, water and reagents were conserved.

DISCUSSION

While in some of the examples above, it is indicated that a chemically pure reagent sulfuric acid having a specific gravity of 1.84 has been employed, it is obvious that in large scale operations commercial grades of sulfuric acid are to be used because they are relatively cheaper.

The use of ferric sulfate as an auxiliary leaching agent along with sulfuric acid is very effective for causing such uranium ores as uraninite and metatorbernite to dissolve as can be seen by reference to Examples 1 and 2 above. The conjoint use of ferric sulfate and sulfuric acid as leaching agents has been found to be very effective for extracting uranium values from the ores described in the opening paragraphs of Examples 3 to 8. These ores assay from 1.8% to 4.4% in $U_3O_8$. The bulk of the uranium in these ores occurs as the minerals uraninite, uranophane, sklodowskite, and metatorbernite. The relative proportions of these uranium minerals varies very widely in these six ores. Other minerals of possible economic importance in these ores are monazite, garnierite, linnaeite, and cobaltite. The bulk of the gangue in these ores is made up of quartz, chlorite, chloritic minerals, and magnesite.

In processing uranium ores in accordance with the present invention it is customary to crush the ores to sizes that are suitable for feed to grinding mills. If the crushed ore contains appreciable proportions of metatorbernite, it is then fed to a kiln or dryer where it is heated to about 200° C. and held at that temperature for approximately 30 minutes. This heat treatment serves to convert the metatorbernite to a lower hydrate which is more readily soluble in the sulfuric acid—ferric sulfate leach solutions used in the present invention. If the ore does not contain appreciable proportions of metatorbernite, this heat treatment step may be omitted. The crushed ore, which has been heat treated if necessary, is then ground to a size that can be handled effectively in the agitation leaching apparatus. Ordinarily, grinding to sizes finer than 20-mesh does not noticeably increase the amount of uranium extracted by leaching. This grinding can conveniently be done in a rod mill. The ground ore is leached continuously in a series of Pachuca agitators using sulfuric acid and ferric sulfate as the leaching reagents. A leaching time of about 24 hours at room temperature and a solid to liquid ratio of 1:1 in the ore pulp have been found helpful in securing an optimum extraction of uranium. The uranium bearing leach liquor is separated from the leached ore residue by conventional countercurrent decantation washing in a series of thickeners. Causticized potato starch may be added to the ore pulp in the thickeners to improve its settling behavior.

The uranium values are precipitated from the pregnant leach liquor by neutralization with caustic calcined magnesia. This precipitation is conducted continuously in a series of several mechanical agitators, a moderate retention time being allowed for completion of the reaction and for developing a fast settling precipitate. The quantity of magnesia added is carefully regulated to give a pH of about 7 in the pulp leaving the last agitator. The magnesia is preferably added in the form of a thick aqueous slurry, but dry caustic calcined magnesia may be added directly to the pregnant leach liquor if desired. The precipitate containing uranium is readily dewatered in conventional thickening, filtering and drying equipment. Of course, if the precipitate is to be subjected to subsequent hydrometallurgical operations at the site, these dewatering operations are not carried out.

If the ores to be leached contain more magnesite in the gangue than the ores described in the opening paragraphs of Examples 3 to 8, then much of the acid consumed in leaching will be used up in reacting with this magnesite. Accordingly, in order to cut down on the acid consumption, it is desirable to separate the magnesite from ores containing large amounts of magnesite before these ores are acid leached for uranium. It has been found that much of the magnesite can be separated from these ores by a froth flotation process using as flotation reagents oleic acid, sodium silicate and a frother such as terpineol. If desired, the impure magnesite that collects in the froth can be carefully calcined at about 800° C. to magnesia which in turn can be employed to precipitate the uranium values from the pregnant leach liquors. The use of the impure floated magnesite as a source material for the magnesia which is to be added to the pregnant leach liquors is often advantageous since this impure floated magnesite contains some uranium minerals. Removal of the magnesite by flotation cuts down considerably on the acid required in leaching the non-floatable tailings of the ore that are left behind.

The leach residues which are left after the uranium has been extracted therefrom are in an ideal condition for further treatment to extract other valuable mineral constituents. The cobalt contained in these leach residues may be dissolved therefrom by the use of sulfurous acid as has been shown above in Examples 22 and 23.

When uranium is extracted by leaching as in the present invention, radium is left behind in the leach residue. Tests have shown that the radium in the residue is largely concentrated in the finest slime sizes, and probably adsorbed on the surfaces of the fine slime particles. A radium concentrate can be prepared from the leach residue by a simple hydroseparation step.

Various alkalis were used for precipitating uranium from its solution in the leach liquors, such as ammonia, lime, sodium hydroxide and magnesia. Ammonia produced a well flocculated precipitate which settled slowly. Moreover, ammonia was a relatively expensive reagent to use for this purpose. Lime was the cheapest of all precipitants which were tested. Its use resulted in nearly complete precipitation of the uranium from the leach liquors, but unfortunately calcium sulfate also precipitated so that the precipitated uranium was considerably contaminated with precipitated calcium sulfate. Precipitation with sodium hydroxide resulted in the formation of slurries that had poor settling and filtering characteristics. Caustic calcined magnesia was found to be clearly superior to all of the other alkali precipitants which were tested. Its use resulted in substantially quantitative precipitation of the uranium values from the leach liquors and the formation of precipitates which had excellent settling and filtering characteristics.

It is believed that the uranium dissolves in the leaching solution as uranyl sulfate and is precipitated therefrom as the diuranate of the alkali that is used to neutralize the leach liquor.

Caustic calcined magnesia has been found to be much more reactive with the leach liquors than dead burned magnesia. The reactivity of the calcined magnesia was somewhat increased by wet grinding before it was added to the leach liquor. The leach liquor was agitated with the magnesia for about an hour to permit the reaction, which was far from instantaneous, to go to completion.

Enough magnesia was added to the leach liquor so that the pH of the liquor at the end of the reaction was about 7. An increase in the quantity of leaching reagents used to leach a given ore always resulted in the necessity of using an increased amount of magnesia in the precipitation step.

It was found that a slow addition of magnesia to the leach liquor, especially over the pH range in which the ferric ion precipitated, produced a precipitate having the best settling and filtering characteristics. Therefore, precipitation was preferably carried out by adding quickly enough magnesia to bring the pH to 2.8, then adding slowly during a 30 minute period of agitation enough magnesia to raise the pH to 4.4, and then to add quickly the rest of the required magnesia and to continue the agitation for another 30 minutes.

While the leaching and precipitation procedures described above in the examples were found to be very effective in the recovery of uranium from ores assaying 1% or more in $U_3O_8$, it has been noted that the consumption of reagents per pound of uranium recovered increased rapidly when the $U_3O_8$ assay of the ore fed to the leaching plant fell to less than 0.5%. Several modified procedures have, therefore, been developed to conserve on the amounts of magnesia, ferric sulfate and water that need to be used.

In one alternative procedure that was developed the ore was leached with a solution containing sulfuric acid and ferric sulfate. Then while the leach liquor was still in contact with the leach residue, limestone or lime was added thereto to partially neutralize the leach liquor. The addition of limestone or lime resulted in the precipitation of ferric iron and calcium sulfate. Then the leach liquor was separated from the leach residue and the precipitated iron and calcium sulfate and treated with magnesia to precipitate the uranium values therefrom. The leach residue containing precipitated iron was then leached with a sulfuric acid solution containing some ferric sulfate and washed with water. The leach and wash liquors obtained from thus treating the leach residue were used in the make-up of a leach solution for leaching fresh ore. The advantages of this alternative procedure were (1) that it made possible the partial substitution of cheap limestone or lime for the more expensive caustic calcined magnesia; (2) that it retained in circuit the ferric iron, thus effectively substituting cheap sulfuric acid for the more expensive ferric sulfate; (3) that it reduced the quantity of water needed, and (4) that it increased the uranium content of the precipitate obtained upon the addition of magnesia to the leach liquor.

In another modified process that was developed, the ore was leached with a solution containing sulfuric acid and ferric sulfate. Then while the leach liquor was still in contact with the leach residue, limestone or lime was added thereto to fully neutralize the leach liquor. This caused the uranium to precipitate along with ferric iron and calcium sulfate. Then air was blown through the leach liquor to convert the ferrous iron therein to ferric iron, which thereupon precipitated. After the aeration step was completed just enough sulfuric acid was added to the leach liquor to cause the uranium precipitate to redissolve, the amount of sulfuric acid used being insufficient to cause the ferric iron precipitate to redissolve. Then the leach liquor was separated from the leach residue (and the precipitated iron and calcium sulfate) and treated with magnesia to precipitate the uranium values therefrom. The leach residue containing precipitated ferric iron was then leached with a sulfuric acid solution, which dissolved the ferric iron precipitate, and washed with water. The leach and wash liquors obtained from thus treating the leach residue were used in the make-up of a leach solution for leaching fresh ore. The advantages of this modified process were similar to those mentioned in the last sentence of the preceding paragraph.

In still another modified procedure that was developed, the ore was leached with an aqueous solution containing sulfuric acid and ferric sulfate. Then while the leach liquor was still in contact with the leach residue, limestone or lime was added thereto in sufficient quantity to fully neutralize the leach liquor. This caused the uranium to precipitate along with ferric iron and calcium sulfate. Then air was blown through the leach liquor to convert the ferrous iron therein to ferric iron, which thereupon precipitated. After the aeration step was completed, just enough sulfuric acid was added to the leach liquor to cause the uranium precipitate to redissolve, the amount of sulfuric acid used being insufficient to cause the ferric iron precipitate to redissolve. Then the leach liquor was separated from the leach residue (and the precipitated iron and calcium sulfate) and treated with magnesia or ammonia to precipitate the uranium values therefrom. The leach residue containing precipitated ferric iron was then leached with a sulfuric acid solution, which dissolved the ferric iron precipitate. The liquor from which the precipitated uranium had been removed was neutralized with acid and used to wash the leach residue from which the precipitated ferric iron had been redissolved. The leach and wash liquors obtained from thus treating the leach residue were used in the make-up of a leach solution for leaching fresh ore. In this modified procedure the process was cyclic in regard to the liquor and used air, limestone or lime, and sulfuric acid, together with a minor quantity of magnesia or ammonia as the effective agents. This process conserved on the amount of water needed and made it possible to obtain a very high grade uranium precipitate by the use of magnesia or ammonia to partially precipitate uranium from the pregnant leach liquor. Unprecipitated uranium remained in the liquor which was recycled to be used in leaching fresh ore.

The above description and examples are intended to be illustrative only and not to limit the scope of the invention. Resort may be had to such modifications and variations as conform to the spirit of the invention and come within the scope of the appended claims.

We claim:

1. A process of extracting uranium from a uranium bearing ore which contains a substantial amount of metatorbernite which comprises subjecting said ore to a moderate heat treatment at 110° C.–200° C. to convert the metatorbernite to a lower hydrate which is more readily soluble in an acid leaching solution, and then treating said ore at ambient temperatures with an unheated leaching solution containing sulfuric acid and initially added ferric sulfate.

2. A process of recovering uranium from a uranium bearing ore which contains an excess of magnesite, which comprises separating the magnesite from said ore by froth flotation, converting said magnesite by calcination to magnesia, treating the ore fraction from which the magnesite has been separated at ambient temperatures with an unheated leaching solution containing sulfuric acid and initially added ferric sulfate, separating the leach liquor from the leach residue, and then neutralizing the leach liquor with the calcined magnesia derived from the ore whereby the uranium values in the leach liquor are caused to precipitate.

References Cited in the file of this patent
UNITED STATES PATENTS

| | | |
|---|---|---|
| 880,645 | Fleck et al. | Mar. 3, 1908 |
| 1,451,734 | Irving | Apr. 17, 1923 |
| 2,199,696 | Fleck | May 7, 1940 |
| 2,367,239 | Renzoni | Jan. 16, 1945 |

OTHER REFERENCES

Mellor: Inorganic and Theoretical Chemistry, vol. 3, page 8 (1923), pub. by Longmans, Green & Co., London, England.

MacTaggert: The Industrial Chemist, vol. 18, pp. 421–426 (November 1942).